(12) United States Patent
Lee et al.

(10) Patent No.: US 9,880,689 B2
(45) Date of Patent: Jan. 30, 2018

(54) TOUCH SCREEN PANEL

(71) Applicant: DONGWOO FINE-CHEM CO., LTD., Jeollabuk-do (KR)

(72) Inventors: Jin Koo Lee, Gyeonggi-do (KR); Cheol Hun Lee, Gyeonggi-do (KR); Dong Pil Park, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 93 days.

(21) Appl. No.: 15/038,182

(22) PCT Filed: Dec. 29, 2014

(86) PCT No.: PCT/KR2014/012997
§ 371 (c)(1),
(2) Date: May 20, 2016

(87) PCT Pub. No.: WO2015/102349
PCT Pub. Date: Jul. 9, 2015

(65) Prior Publication Data
US 2016/0299631 A1 Oct. 13, 2016

(30) Foreign Application Priority Data

Dec. 30, 2013 (KR) .................. 10-2013-0167447
Dec. 26, 2014 (KR) .................. 10-2014-0190265

(51) Int. Cl.
*G06F 3/044* (2006.01)
*G02F 1/1333* (2006.01)

(52) U.S. Cl.
CPC .......... *G06F 3/044* (2013.01); *G02F 1/13338* (2013.01); *G06F 2203/04103* (2013.01); *G06F 2203/04111* (2013.01)

(58) Field of Classification Search
CPC .......... G06F 3/041–3/048; G06F 3/044; G06F 2203/04103; G06F 3/0412; G06F 3/03547; G02F 1/133512; G02F 1/13338
See application file for complete search history.

(56) References Cited

U.S. PATENT DOCUMENTS

2007/0262962 A1* 11/2007 Xiaoping .................. G06F 1/32
345/173
2010/0045613 A1* 2/2010 Wu .......................... G06F 3/044
345/173

(Continued)

FOREIGN PATENT DOCUMENTS

| KR | 10-2011-0095669 A | 8/2011 |
|----|-------------------|--------|
| KR | 10-2013-0078065 A | 7/2013 |
| WO | 2010-002202 A2    | 1/2010 |

OTHER PUBLICATIONS

International Search Report for PCT/KR2014/012997.

*Primary Examiner* — Sanjiv D Patel
(74) *Attorney, Agent, or Firm* — The PL Law Group, PLLC

(57) ABSTRACT

Disclosed is a touch screen panel including: a touch sensing electrode; and a pixel part disposed on a bottom of the touch sensing electrodes, wherein the touch sensing electrode includes: sensing patterns which include first patterns formed in a first direction and second patterns formed in a second direction; bridge electrodes which electrically connect separated unit patterns of the second patterns; and at least one auxiliary pattern which is provided on a top or a bottom of at least one of the first patterns and second patterns, the pixel part includes a plurality of unit pixels, and the auxiliary patterns respectively satisfy Equation 1, thereby having excellent touch sensitivity due to significantly decreased resistance of a touch screen panel.

19 Claims, 9 Drawing Sheets

(56) References Cited

U.S. PATENT DOCUMENTS

| | | |
|---|---|---|
| 2011/0290547 A1 | 12/2011 | Chen et al. |
| 2013/0201348 A1* | 8/2013 | Li .......................... G06F 3/044 348/174 |
| 2014/0139761 A1* | 5/2014 | Yanagawa ............... G06F 3/044 349/12 |

* cited by examiner

TOUCH SCREEN PANEL

CROSS REFERENCE TO RELATED APPLICATIONS AND CLAIM OF PRIORITY

This application claims benefit under 35 U.S.C. 119(e), 120, 121, or 365(c), and is a National Stage entry from. International Application No. PCT/KR2014/012997, filed on Dec. 29, 2014, which claims priority to the benefit of Korean Patent Application Nos. 10-2013-0167447 filed on Dec. 30, 2013 and 10-2014-0190265 filed on Dec. 26, 2014 in the Korean Intellectual Property Office, the entire contents of which are incorporated herein by reference.

BACKGROUND OF THE INVENTION

1. Field of the Invention

The present invention relates to a touch screen panel with improved touch sensitivity due to significantly decreased resistance of a touch sensing electrode.

2. Description of the Related Art

Commonly, a touch screen is a screen equipped with a special input device to receive position input by touching the screen with a finger of a user or a stylus pen. Such a touch screen does not use a keyboard but has a configuration of multi-layer laminates wherein, when the finger of the user or an object such as a touch pen or a stylus pen touches a specific character or position displayed on a screen, the touch screen identifies the position and directly receives data from the screen, in order to practically process information at a specific position by a software stored therein.

In order to recognize the touched position without degrading the visibility of an image displayed on the screen, it is necessary to use a transparent sensing electrode in which sensing patterns are formed in a predetermined pattern in general.

The transparent sensing electrode may be formed by first sensing patterns and second patterns. The first and second patterns are disposed in different directions from each other to provide information on X and Y coordinates of a touched point. Specifically, when the finger of the user or the object touches a transparent substrate, a change in capacitance depending on a contact position is detected and transferred to a driving circuit through the first and second patterns, and a metal wiring which is a position detecting line. Then, the change in capacitance is converted to an electrical signal by X and Y input processing circuits to identify the contact position.

Currently, in a capacitance type touch screen panel, as a material of a transparent touch sensing electrode, indium tin oxide (ITO), a conductive polymer, or the like is used. However, in the electrode made of ITO, the conductive polymer, or the like, a high sheet resistance problem may occur.

In addition, when using a bridge electrode, there is a problem of a decrease in transmittance of the touch screen panel.

For example, Korean Patent Laid-Open Publication No. 2013-0078065 discloses a touch panel which includes first and second electrode patterns provided on both sides of a transparent substrate and an image forming device provided on the transparent substrate.

SUMMARY OF THE INVENTION

Accordingly, it is an object of the present invention to provide a touch screen panel with improved touch sensitivity due to significantly decreased resistance of a touch sensing electrode.

In addition, another object of the present invention is to provide a touch screen panel having reduced a decrease in transmittance.

The above object of the present invention will be achieved by the following characteristics:

(1) A touch screen panel including: a touch sensing electrode; and a pixel part disposed on a bottom of the touch sensing electrodes, wherein the touch sensing electrode includes: sensing patterns which include first patterns formed in a first direction and second patterns formed in a second direction; bridge electrodes which electrically connect separated unit patterns of the second patterns; and at least one auxiliary pattern which is provided on a top or a bottom of at least one of the first patterns and second patterns, the pixel part includes a plurality of unit pixels, and the auxiliary patterns respectively satisfy Equation 1 below:

$$0.06 \leq (P2/P1)*(P3/A) \leq 0.135 \qquad \text{[Equation 1]}$$

(wherein, P1 denotes a line width of the auxiliary pattern in a range of 0.01 to 40 μm, P2 denotes a thickness of the auxiliary pattern in a range of 0.005 to 20 μm, P3 denotes a length of the auxiliary pattern in an upper area of the unit pixel in a range of 5 to 500 μm, and A denotes a length of the unit pixel).

(2) The touch screen panel according to the above (1), the P1 is 1 to 30 μm.

(3) The touch screen panel according to the above (1), the P2 is 0.05 to 1.5 μm.

(4) The touch screen panel according to the above (1), the P3 is 5 to 400 μm.

(5) The touch screen panel according to the above (1), the A is 20 to 500 μm.

(6) The touch screen panel according to the above (1), the P1 is 1 to 10 μm.

(7) The touch screen panel according to the above (1), the P2 is 0.1 to 1.5 μm.

(8) The touch screen panel according to the above (1), the P3 is 10 to 300 μm.

(9) The touch screen panel according to the above (1), the A is 20 to 400 μm.

(10) The touch screen panel according to the above (1), the P1 is 1 to 10 μm, P2 is 0.1 to 1.5 μm, P3 is 10 to 300 μm, and A is 20 to 400 μm.

(11) The touch screen panel according to the above (1), the P3 has the same value as A or a larger value than A.

(12) The touch screen panel according to the above (1), the first pattern is provided with a first auxiliary pattern formed in the first direction, and the second pattern is provided with a second auxiliary pattern formed in the second direction.

(13) The touch screen panel according to the above (1), the first and second auxiliary patterns are formed of the same material as the bridge electrode.

(14) The touch screen panel according to the above (1), the unit patterns of the first patterns and the second patterns have a sheet resistance of 50 to 500Ω/□.

(15) The touch screen panel according to the above (12), the second auxiliary patterns are connected to the bridge electrodes.

(16) The touch screen panel according to the above (12), the second auxiliary patterns are separated from the bridge electrodes.

(17) The touch screen panel according to the above (12), the first and second auxiliary patterns include one or more separated additional auxiliary patterns, respectively.

(18) The touch screen panel according to the above (12), the first auxiliary pattern is separated into two or more unit patterns on a top or a bottom of the unit pattern of the first pattern, and two of the separated unit patterns are disposed so as to be biased toward the bridge electrode.

(19) The touch screen panel according to the above (12), the second auxiliary pattern is separated into two or more unit patterns on a top or a bottom of the unit pattern of the second pattern, and two of the separated unit patterns are disposed so as to be biased toward the bridge electrode.

(20) The touch screen panel according to the above (1), the bridge electrode has a line width of 1 to 30 μm.

(21) The touch screen panel according to the above (1), the bridge electrode has a thickness of 0.05 to 1.5 μm.

(22) The touch screen panel according to the above (1), the bridge electrode is made of at least one selected from molybdenum, silver, aluminum, copper, palladium, gold, platinum, zinc, tin, and titanium, or an alloy thereof.

(23) An image display device including the touch screen panel according to any one of the above (1) to (22).

The touch screen panel of the present invention has excellent touch sensitivity due to significantly decreased resistance of a touch screen panel, and improved transmittance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention discloses a touch screen panel including: a touch sensing electrode; and a pixel part disposed on a bottom of the touch sensing electrodes, wherein the touch sensing electrode includes: sensing patterns which include first patterns formed in a first direction and second patterns formed in a second direction; bridge electrodes which electrically connect separated unit patterns of the second patterns; and at least one auxiliary pattern which is provided on a top or a bottom of at least one of the first patterns and second patterns, the pixel part includes a plurality of unit pixels, and the auxiliary patterns respectively satisfy Equation 1, thereby having excellent touch sensitivity due to significantly decreased resistance of a touch screen panel, and improved transmittance.

Hereinafter, exemplary embodiments of the present invention will be described in detail with reference to the accompanying drawings.

<Pixel Part>

The touch screen panel of the present invention includes a pixel part 90 which is commonly used in the related.

The pixel part 90 is a portion that can implement red, green, and blue colors, and a configuration and position of the pixel part 90 are not particularly limited, which may include a configuration commonly used in the related art, and may be formed at a position commonly formed in the related art. Specifically, the pixel part 90 may be located on a bottom (i.e., a side opposite to a viewer side based on the touch sensing electrode) of the touch sensing electrode based on the viewer side.

Figure 10:
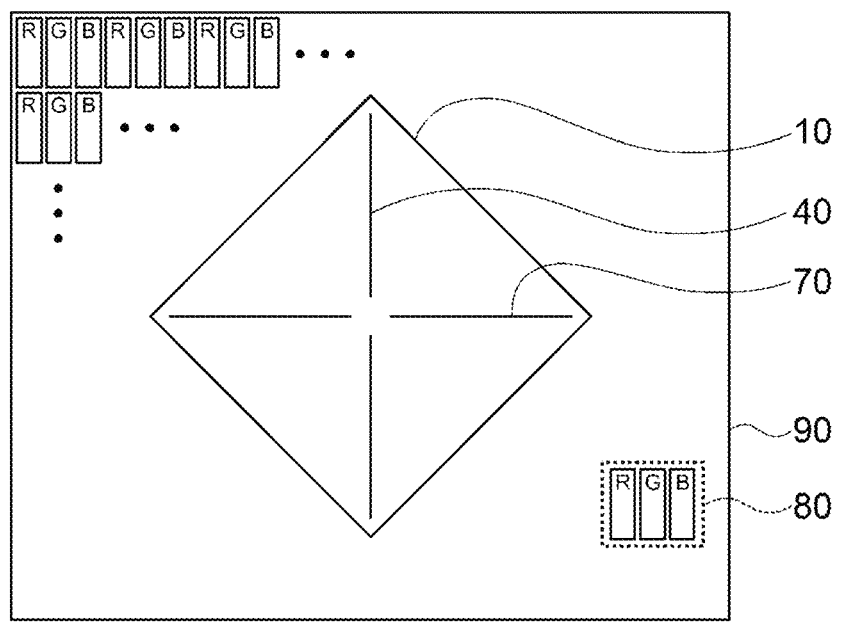
FIG. 10 is a schematic plan view illustrating a first pattern, a first auxiliary pattern, an additional auxiliary pattern, and a unit pixel formed in a touch screen panel according to another embodiment of the present invention.

As illustrated in FIG. 10, the pixel part 90 includes a plurality of unit pixels 80. Herein, the unit pixels 80 may include sub pixels of R, G, and B colors.

Figure 11:
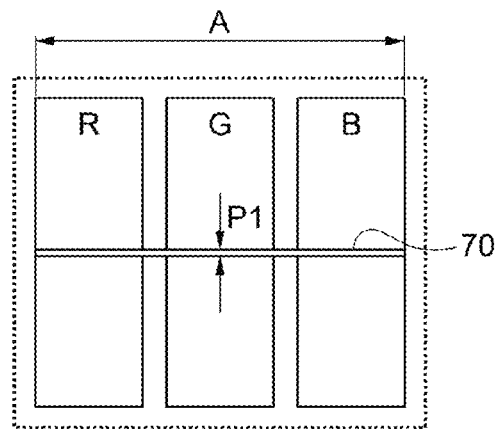
FIG. 11 is a schematic plan view illustrating a line width of the auxiliary pattern and a length of the unit pixel formed in the touch screen panel according to another embodiment of the present invention.

A length A of the unit pixel 80 refers to a length of the unit pixel 80 in a direction transverse to the sub pixels of R, G, and B colors, as illustrated in FIG. 11.

The length of the unit pixel 80 is not particularly limited so long as it satisfies a range of Equation 1 to be described below, and may be, for example, 20 to 500 μm. Preferably, the unit pixel 80 has a length of 20 to 400 μm, but it is not limited thereto, and may be varied depending on a used image forming device.

<Touch Sensing Electrode>

Sensing Pattern

The sensing patterns may include first patterns 10 formed in a first direction and second patterns 20 formed in a second direction.

Herein, the first pattern 10 and the second pattern 20 are disposed in different directions from each other. For example, the first pattern 10 may be disposed in an X direction which is the first direction, and the second pattern 20 may be disposed in a Y direction which is the second direction orthogonal to the first direction, but it is not limited thereto.

The first and second patterns 10 and 20 provide information on X and Y coordinates of a touched point. Specifically, when a finger of the user or an object touches a cover window substrate, a change in capacitance depending on a contact position is detected and transferred to a driving circuit through the first and second patterns 10 and 20, and a position detecting line. Then, the change in capacitance is converted to an electrical signal by X and Y input processing circuits (not illustrated) to identify the contact position.

In this regard, the first and second patterns 10 and 20 have to be formed in the same layer of the substrate, and the respective patterns have to be electrically connected with each other to detect the touched position. However, the first patterns 10 are connected with each other through connection parts, while the second patterns 20 are separated from each other in an island form, thereby additional bridge electrodes 30 are needed to electrically connect the second patterns 20 with each other. The bridge electrodes 30 will be described below.

A thickness of the sensing patterns is not particularly limited but may be, for example, in a range of 10 to 200 nm, respectively. If the thickness of the sensing patterns is less than 10 nm, electrical resistance may be increased to degrade the touch sensitivity, and if the value exceeds 200 nm, the reflectance may be increased to deteriorate the visibility.

Any conventional materials used in the related art may be adopted to the sensing patterns without particular limitation thereof. For example, indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), graphene, metal wire, etc. These may be used alone or in a combination of two or more thereof, and indium-tin oxide (ITO) may be used. Metals used in the metal wire are not particularly limited but may include, for example, silver (Ag), gold, aluminum, copper, iron, nickel, titanium, tellurium, chromium, etc., which are used alone or in a combination of two or more thereof.

The unit patterns of the sensing pattern may have a sheet resistance of 50 to 500Ω/□. When the sheet resistance is less than 50Ω/□, a resolution may be decreased due to low transmittance, and if the value exceeds 500Ω/□, touch sensitivity may be decreased.

A method of controlling the sheet resistance may use any method known in the related art without particular limitation thereof. For example, the sheet resistance may be controlled by a method of changing a material of the sensing patterns, mixing an additional material therewith, increasing the thickness of the sensing patterns, or the like.

Bridge Electrode

The bridge electrode 30 electrically connects the separated unit patterns of the second pattern 20.

Herein, the bridge electrode 30 has to be electrically isolated from the first pattern 10 of the sensing patterns. For this, there is a need to form an additional insulator, which will be described below.

The bridge electrode 30 may be formed on a top or a bottom of the second pattern 20.

The bridge electrode 30 according to the present invention may be formed of a metal material, and preferably of the same material as a metal wiring and a position detecting line. In this case, since the bridge electrode 30 may be simultaneously formed during forming the metal wiring and the position detecting line, it is possible to further simplify the process.

The metal material is not particularly limited so long as it has excellent electrical conductivity with low resistance, but may include, for example, molybdenum, silver, aluminum, copper, palladium, gold, platinum, zinc, tin, or titanium, etc., which may be used alone or in combination of two or more thereof.

A line width of the bridge electrode 30 is not particularly limited but may be, for example, 1 to 30 μm, and preferably, 1 to 20 μm, but it is not limited thereto. If the line width of the bridge electrode 30 is less than 1 μm, resistance may be excessively increased, and if the value exceeds 30 μm, the sensing patterns may be seen from an outside.

A thickness of the bridge electrode 30 is not particularly limited but may be, for example, 0.05 to 1.5 μm, and preferably, 0.1 to 1 μm, but it is not limited thereto. If the thickness of the bridge electrode 30 is less than 0.05 μm, the touch sensitivity may be decreased due to the resistance is not sufficiently decreased, and if the value exceeds 1.5 μm, an unevenness in the thickness may occur in subsequent processes.

In addition, the bridge electrode 30 may have a shape in which two or more metals are laminated. The bridge electrode 30 may be formed of two or more metals within the above-described metal material in a multi-layered structure such as two or three layer, etc. For example, the bridge electrode 30 may be formed in a three-layered structure of molybdenum/aluminum/molybdenum, but it is not limited thereto.

Auxiliary Pattern

The touch sensing electrode according to the present invention may at least one auxiliary pattern which is provided on a top or a bottom of at least one of the first pattern and second pattern.

In one embodiment of the present invention, the auxiliary pattern provided on the top or the bottom of the first pattern is referred to as a first auxiliary pattern 40, and the auxiliary pattern provided on the top or the bottom of the second pattern is referred to as a second auxiliary pattern 50.

As described above, when the resistance of the touch sensing electrode is increased, the touch sensitivity of the touch screen panel may be decreased. In order to solve this problem, the resistance may be decreased by forming the auxiliary pattern, but if the auxiliary pattern has an excessively large size, transmittance may be decreased.

In the present invention, the first and second auxiliary patterns 40 and 50 satisfy Equation 1 below, such that the above-described problem may be solved by significantly decreasing the resistance of the sensing patterns without a large decrease in the transmittance.

$$0.06 \leq (P2/P1)*(P3/A) \leq 0.135 \quad \text{[Equation 1]}$$

(wherein, P1 denotes a line width of the auxiliary pattern in a range of 0.01 to 40 μm, P2 denotes a thickness of the auxiliary pattern in a range of 0.005 to 20 μm, P3 denotes a length of the auxiliary pattern in an upper area of the unit pixel in a range of 5 to 500 μm, and A denotes a length of the unit pixel).

FIG. 10 illustrates a schematic displacement relation between the touch sensing patterns (the first patterns 10), the first auxiliary pattern 40, and the unit pixel 80, and FIG. 11 illustrates a definition of the line width P1 and the length A of the unit pixel.

In the present invention, two or more auxiliary patterns may be formed on the area of one unit pixel 80. In this case, P3 is a value obtained by adding the length of each auxiliary pattern.

If the Y value (hereinafter, in the present disclosure, (P2/P1)*(P3/A) is referred to as a Y value) which is a value of (P2/P1)*(P3/A) in Equation 1, is less than 0.06, the resistance of the sensing patterns is significantly increased, and if the value exceeds 0.135, the transmittance is decreased. As described above, when the auxiliary pattern satisfies Equation 1, the touch sensitivity is significantly improved without a large decrease in the transmittance.

The line width P1 of the first and second auxiliary patterns 40 and 50 may be 1 to 30 μm, and preferably, 1 to 10 μm. If the line width of the auxiliary patterns is less than 1 μm, the resistance may be excessively increased, and if the value exceeds 30 µm, the sensing patterns may be seen from an outside.

The thickness P2 of the first and second auxiliary patterns 40 and 50 may be 0.05 to 1.50 µm, and preferably, 0.1 to 1.5 µm. If the thickness of the auxiliary patterns is less than 0.05 µm, the touch sensitivity may be decreased due to the resistance is not sufficiently decreased, and if the value exceeds 1.5 µm, an unevenness in the thickness may occur in the subsequent processes.

The length P3 of the first and second auxiliary patterns 40 and 50 may be 5 to 400 µm, and preferably, 10 to 300 µm. If the length of the auxiliary patterns is less than 5 µm, an effect of the decrease in the resistance may be insignificant, and if the value exceeds 400 µm, the transmittance may be decreased.

In one embodiment of the present invention, when two or more auxiliary patterns are formed in the upper area of the unit pixel 80 and a plurality of unit pixels 80 are provided, an interval between the auxiliary patterns on each unit pixel 80 may be the same, and when three or more auxiliary patterns are formed in the upper area of the unit pixel 80, the interval between the auxiliary patterns may be the same as each other.

In one embodiment of the present invention, the line width P1 of the first and second auxiliary patterns 40 and 50 may be 1 to 10 µm, the thickness P2 of the first and second auxiliary patterns 40 and 50 may be 0.1 to 1.5 µm, the length P3 of the first and second auxiliary patterns 40 and 50 may be 10 to 300 µm, and the length A of the unit pixel 80 may be 20 to 400 µm, and within the above-described range, the auxiliary pattern may have excellent transmittance and significantly decreased resistance.

In another embodiment of the present invention, the length P3 of the first and second auxiliary patterns 40 and 50 may be the same as or larger than the length A of the unit pixel 80. In this case, the auxiliary pattern may have excellent transmittance and significantly decreased resistance.

The direction of the first and second auxiliary patterns 40 and 50 is not particularly limited, and for example, the first auxiliary pattern 40 and the second auxiliary pattern 50 may be formed in the first direction and the second direction, respectively. The first patterns 10 are connected with each other in the first direction to transmit a sensing signal, and the second patterns 20 are connected with each other by the bridge electrodes 30 to transmit the sensing signal. Therefore, when the first and second auxiliary patterns 40 and 50 are formed in the respective directions, effects of decreasing the resistance and improving the touch sensitivity may be maximized.

In an aspect of decreasing the resistance and improving the touch sensitivity, preferably, the first auxiliary pattern 40 may be formed so as to pass through a center of mass of the unit patterns of the first pattern 10, and the second auxiliary pattern 50 may be formed so that an elongation line thereof passes through the center of mass of the unit bridge electrodes.

Figure 1:
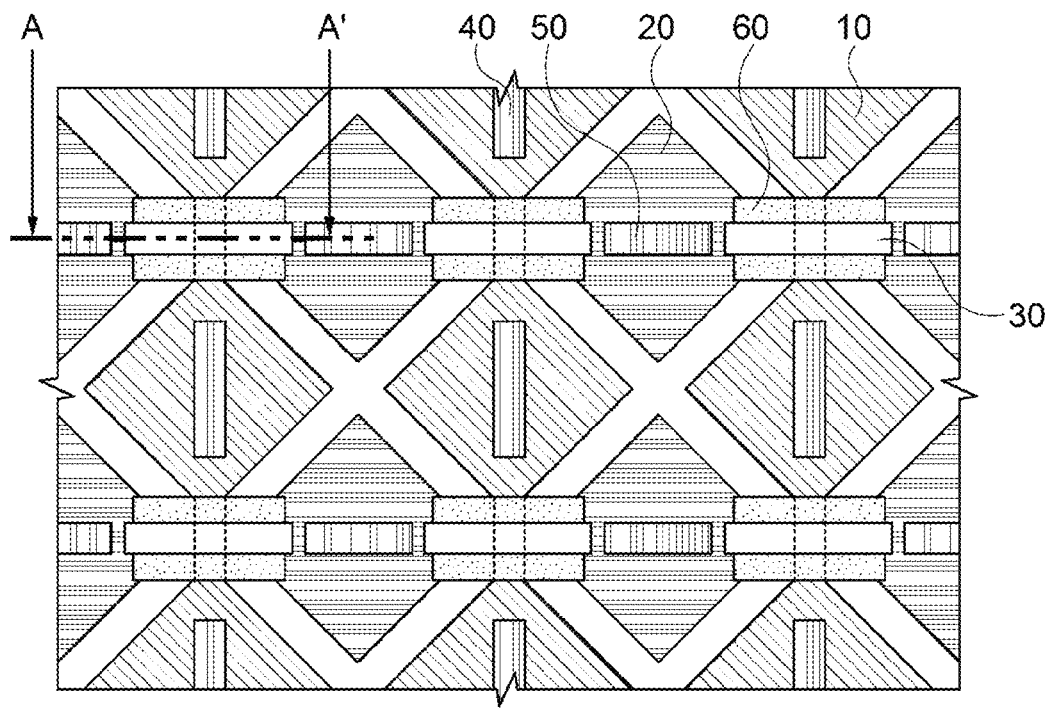
FIG. 1 is a plan view of a touch sensing electrode according to one embodiment of the present invention.
Figure 2:
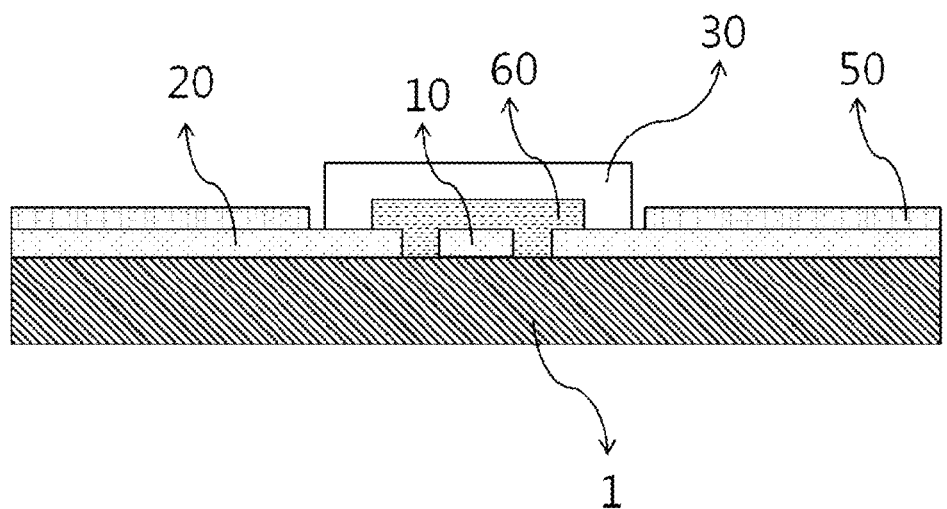
FIG. 2 is a vertical sectional view of the touch sensing electrode according to one embodiment of the present invention taken on line A-A' in FIG. 1.
Figure 3:
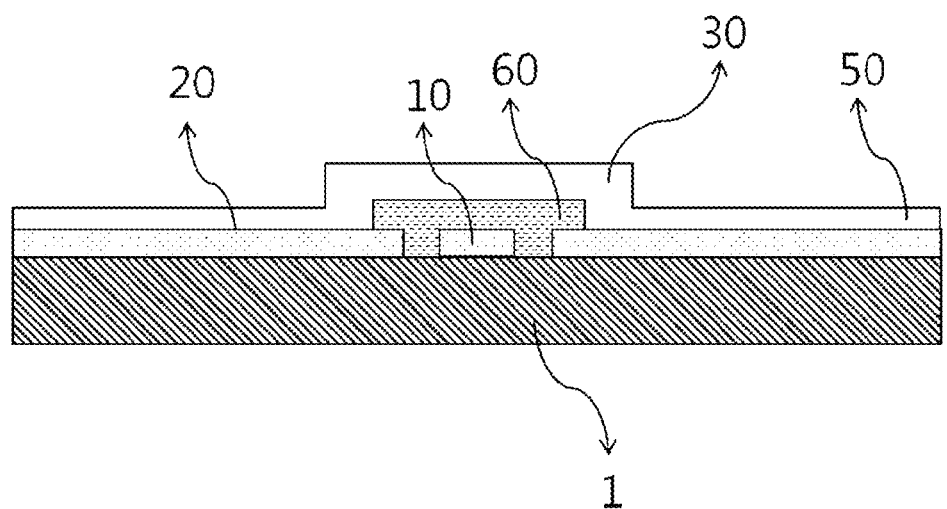
FIG. 3 is a vertical sectional view of the touch sensing electrode according to another embodiment of the present invention.

FIG. 1 is a plan view of the touch sensing electrode in which the first and second auxiliary patterns 40 and 50 according to one embodiment of the present invention are formed on the top of the sensing pattern, and FIGS. 2 and 3 are vertical sectional view of the touch sensitivity according to one embodiment of the present invention. As illustrated in FIGS. 1 to 3, the first and second auxiliary patterns 40 and 50 may be formed on the top of the sensing pattern. Alternately, as illustrated in FIG. 2, the bridge electrode 30 and the second auxiliary pattern 50 may be separated from each other, and as illustrated in FIG. 3, and may be connected with each other.

When the first and second auxiliary patterns 40 and 50 are formed on the sensing pattern, the first auxiliary pattern 40 may be formed so as to be separated from the bridge electrode 30, and may be selectively formed on the connection parts between the unit patterns of the first pattern 10 crossing the bridge electrode 30.

Figure 4:
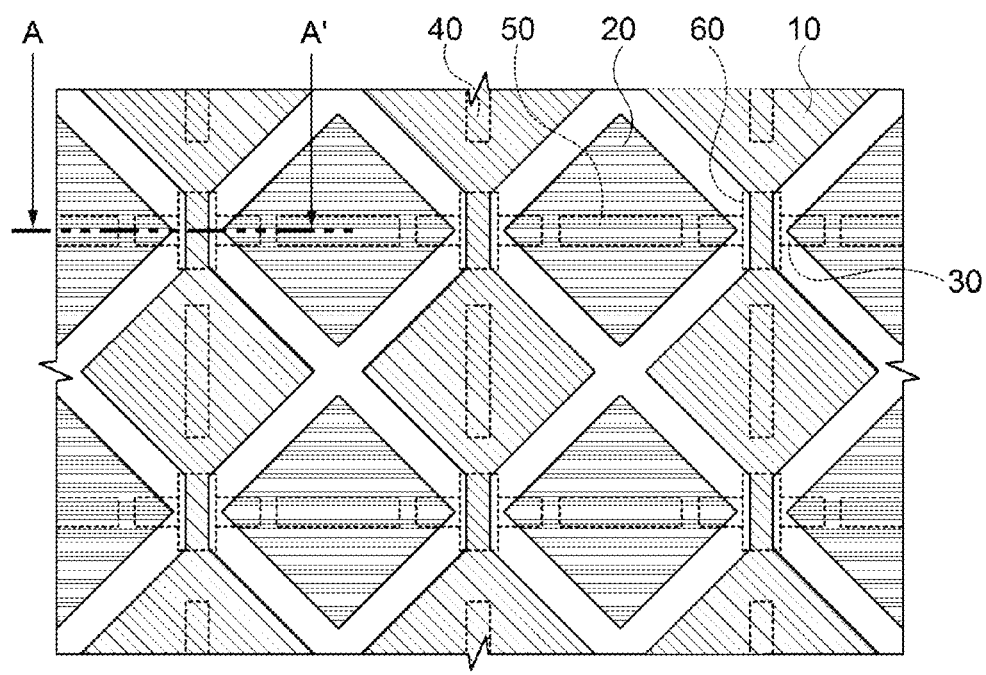
FIG. 4 is a plan view of a touch sensing electrode according to another embodiment of the present invention.
Figure 5:
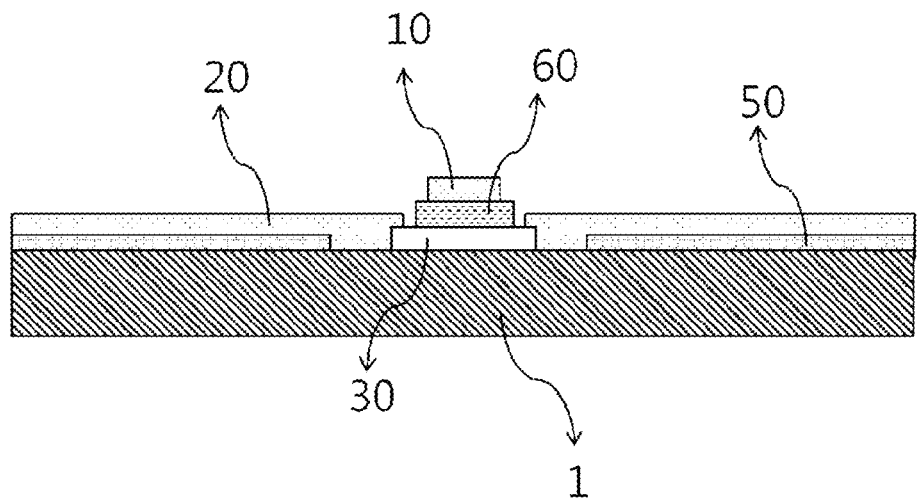
FIG. 5 is a vertical sectional view of the touch sensing electrode according to one embodiment of the present invention taken on line A-A' in FIG. 4.
Figure 6:
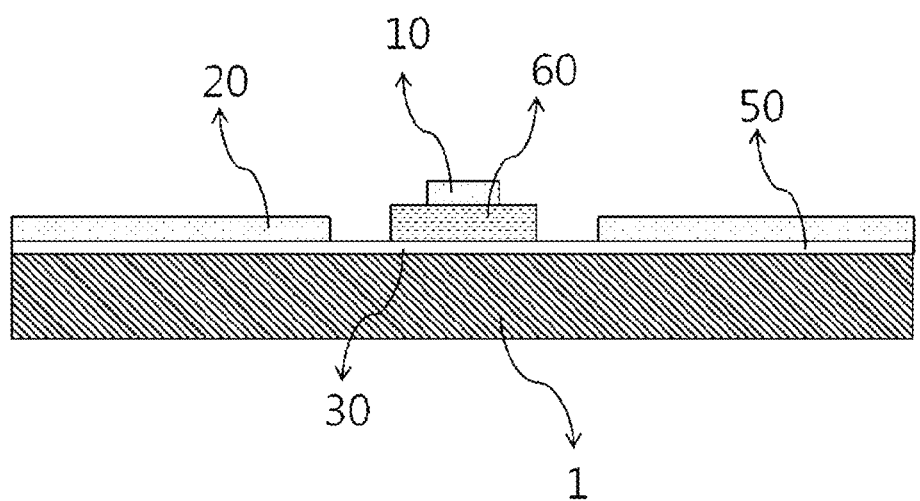
FIG. 6 is a vertical sectional view of the touch sensing electrode according to another embodiment of the present invention.

In addition, FIG. 4 is a plan view of the touch sensing electrode in which the first and second auxiliary patterns 40 and 50 are formed on the bottom of the sensing pattern, and FIGS. 5 and 6 are vertical sectional views of the touch sensitivity according to another embodiment of the present invention, respectively. As illustrated in FIGS. 4 to 6, the first and second auxiliary patterns 40 and 50 may be formed on the bottom of the sensing pattern. Alternately, as illustrated in FIG. 5, the bridge electrode 30 and the second auxiliary pattern 50 may be separated from each other, and as illustrated in FIG. 6, and may be connected with each other.

In addition, the first auxiliary pattern 40 may be separated into two or more unit patterns on the top or the bottom of the unit pattern of the first pattern 10, and two of the separated unit patterns may be disposed so as to be biased toward the bridge electrode 30.

Similarly, the second auxiliary pattern 50 may be separated into two or more unit patterns on the top or the bottom of the unit pattern of the second pattern 20, and two of the separated unit patterns may be disposed so as to be biased toward the bridge electrode 30.

The first pattern 10 and the second pattern 20 cross each other through an insulator by the bridge electrodes 30 which electrically connect the second patterns 20 in the second direction. Since the resistance of the sensing patterns is increased at the intersection, if the sensing patterns are formed as the above-described structure, an effect of decreasing the resistance may be maximized.

Figure 7:
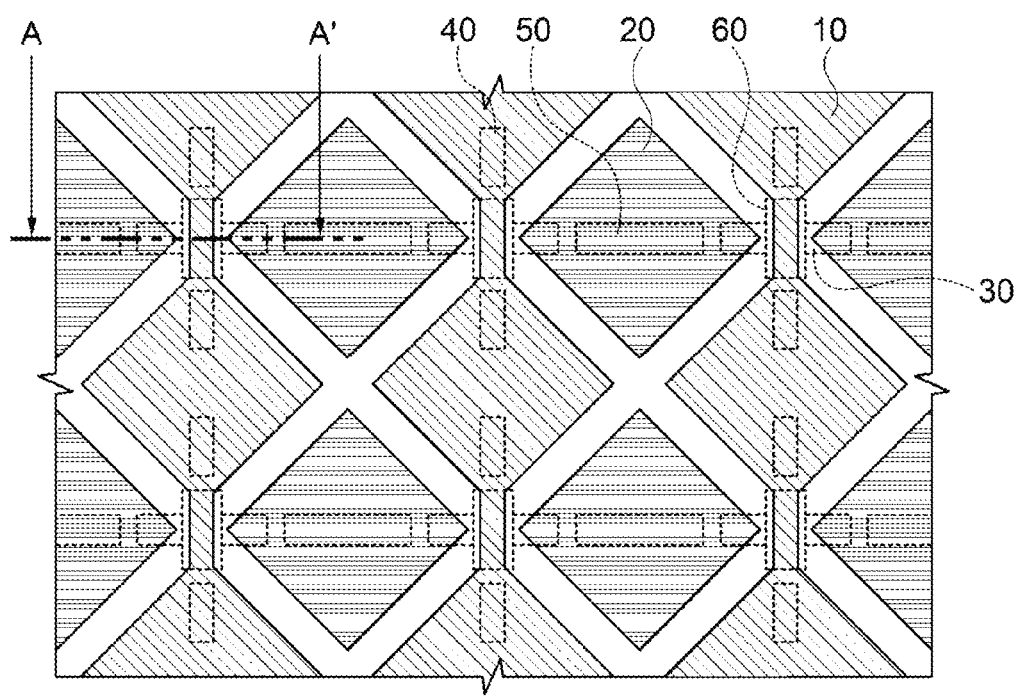
FIG. 7 is a plan view of a touch sensing electrode according to another embodiment of the present invention.

FIG. 7 is a plan view of the touch sensitivity according to another embodiment of the present invention in which the first and second auxiliary patterns 40 and 50 are formed on the bottom of the first pattern 10 and the second pattern 20. FIG. 7 illustrated an exemplary structure in which the first auxiliary pattern 40 is separated into two unit patterns on the bottom of the unit pattern of the first pattern 10, and the separated unit patterns are disposed so as to be biased toward the bridge electrode 30.

Additionally, each of the first and second auxiliary patterns 40 and 50 may further include at least one additional auxiliary pattern 70 separated from each other, respectively.

The additional auxiliary pattern 70 refers to a pattern other than the pattern formed in the first direction in the first auxiliary pattern 40, and a pattern other than the pattern formed in the second direction in the second auxiliary pattern 50.

Figure 8:
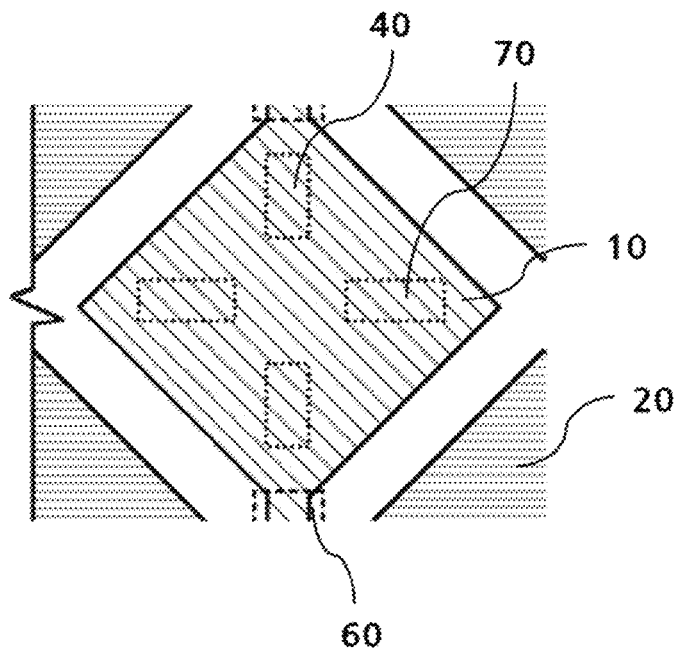
FIG. 8 is a plan view illustrating a unit pattern of a first pattern formed in the touch sensing electrode according to another embodiment of the present invention.
Figure 9:
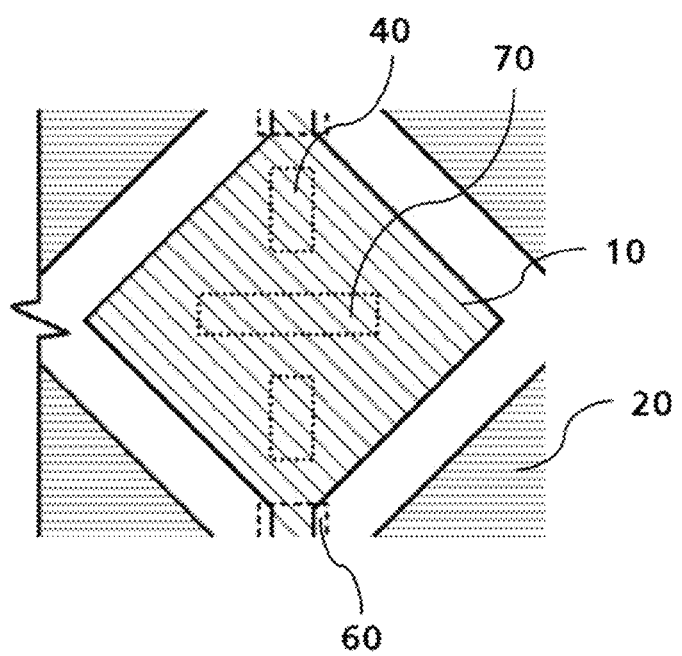
FIG. 9 is a plan view illustrating a unit pattern of the first pattern formed in the touch sensing electrode according to another embodiment of the present invention similar to FIG. 8.

FIGS. 8 and 9 illustrate the case of further including the additional auxiliary patterns 70 formed in the second direction, in addition to the pattern in which the first auxiliary pattern 40 is formed in the first direction. As described above, the auxiliary patterns further include the additional auxiliary patterns 70, and FIGS. 8 and 9 illustrate the case of further including the additional auxiliary patterns 70 formed in the second direction, but this is only an example, and the direction thereof is not particularly limited.

The additional auxiliary pattern 70 may be formed in various shapes and directions.

In regards of the shape, the additional auxiliary pattern may be formed in various shapes including a polygon such as a circle, an ellipse, a triangle, a square, a pentagon, etc., without particular limitation thereof.

In addition, the first auxiliary pattern 40 may be formed in the first direction except for portions where the bridge electrodes 30 are formed, so as not to contact with the bridge electrode 30, and the second auxiliary pattern 50 may be formed by connecting with the bridge electrode 30.

The first and second auxiliary patterns 40 and 50 may be formed of the metals exemplified for the material of the bridge electrode 30, and preferably, may be formed of the same material as the bridge electrode 30. In this case, since the first and second auxiliary patterns 40 and 50 may be simultaneously formed during forming the bridge electrode 30, process efficiency may be significantly improved.

Insulator

An insulator 60 is formed between the first patterns 10 and the bridge electrode 30 for preventing an electrical connection between the first patterns 10 and the bridge electrode 30.

The insulator 60 may be locally formed between the first pattern 10 and the bridge electrode 30, and specifically, may be formed only on the connection parts of the unit patterns of the first patterns 10 in a pattern shape.

Any conventional insulation material known in the related art may be used for the insulator 60 without particular limitation thereof. For example, the insulator 60 may be formed in a desired pattern using metal oxide such as silicon oxide, a transparent photosensitive resin composition including an acryl resin, or a thermosetting resin composition.

Substrate

The touch sensing electrode of the present invention is formed on a substrate 1.

The substrate 1 may be prepared of any material known in the related art without particular limitation thereof. For example, glass, polyethersulfone (PES), polyacrylate (PAR), polyetherimide (PEI), polyethylene napthalate (PEN), polyethylene terepthalate (PET), polyphenylene sulfide (PPS), polyallylate, polyimide, polycarbonate (PC), cellulose triacetate (TAC), cellulose acetate propionate (CAP), or the like, may be used.

The substrate 1 may be configured as one face of a cover window substrate forming an outermost surface of the touch screen panel or a display panel.

<Method of Fabricating a Touch Sensing Electrode>

In addition, the present invention provides a method of fabricating a touch sensing electrode.

Hereinafter, the method of fabricating a touch sensing electrode according to one embodiment of the present invention will be described.

First, sensing patterns are formed including first patterns in which unit patterns are formed by connecting at the connection parts, and second patterns are formed in which unit patterns are separately formed in the second direction based on the connection parts.

The first pattern 10 and the second pattern 20 are disposed in different directions from each other. For example, the first pattern 10 may be disposed in the X direction which is the first direction, and the second pattern 20 may be disposed in the Y direction which is the second direction orthogonal to the first direction, but it is not limited thereto.

The first patterns 10 and the second patterns 20 are formed in the same layer, and the unit patterns of the first patterns 10 are connected with each other through connection parts, while the second patterns 20 are separated from each other in an island form.

The sensing patterns may be formed by various thin film deposition techniques such as a physical vapor deposition (PVD) method, a chemical vapor deposition (CVD) method or the like. For example, the sensing patterns may be formed by reactive sputtering which is an example of the PVD method.

In addition, the sensing pattern may be formed by a printing process. To print the sensing pattern, various printing methods such as gravure offset printing, reverse offset printing, ink-jet printing, screen printing, gravure printing, etc., may be used during the printing process. In particular, when the sensing pattern is formed by the printing process, it may be made of a printable paste material. As an example, the sensing pattern may be made of a carbon nano tube (CNT), a conductive polymer, and Ag nano wire ink.

In addition to the above-described method, the sensing pattern may be formed by photolithography.

The sensing pattern may be formed by properly selecting within the above-described material and thickness ranges.

Then, the insulator 60 is formed on the connection parts of the unit patterns of the first patterns 10.

The insulator 60 functions to electrically isolate the first pattern 10 from the bridge electrode 30 to be described below.

The insulator 60 may be formed of a material from within the above-described range.

Next, the bridge electrode 30 is formed on the insulator 60 for electrically connecting the unit patterns of the second patterns 20.

The bridge electrode 30 may be formed within the above-described range of the line width, the thickness, and the material.

Then, the first auxiliary pattern 40 is formed on the first pattern 10, and the second auxiliary pattern 50 is formed on the second pattern 20.

The direction of the first and second auxiliary patterns 40 and 50 is not particularly limited, and for example, the first auxiliary pattern 40 and the second auxiliary pattern 50 may be formed in the first direction and the second direction, respectively.

The first patterns 10 are connected with each other in the first direction to transmit a sensing signal, and the second patterns 20 are connected with each other by the bridge electrodes 30 to transmit the sensing signal. Therefore, it is preferable that the first and second auxiliary patterns 40 and 50 are formed in the first and second directions, respectively, in an aspect of decreasing the resistance and improving the touch sensitivity, and more preferably, the first auxiliary pattern 40 is formed so as to pass through the center of mass of the unit patterns of the first pattern 10, and the second auxiliary pattern 50 is formed so that an elongation line thereof passes through the center of mass of the unit bridge electrodes.

The first and second auxiliary patterns 40 and 50 may be formed within the above-described range of the line width, the thickness, the length, and the material, and may be formed of the same material as the bridge electrode 30. In this case, it is possible to form the bridge electrode 30 and the first auxiliary pattern 40 in one process by using the same equipment without using separate equipment and processes for forming the same, respectively, such that the process efficiency may be significantly improved.

In addition, the first auxiliary pattern 40 may be separated into two or more unit patterns on the top or the bottom of the unit pattern of the first pattern 10, and two of the separated unit patterns may be disposed so as to be biased toward the bridge electrode 30.

Similarly, the second auxiliary pattern 50 may be separated into two or more unit patterns on the top or the bottom of the unit pattern of the second pattern 20, and two of the separated unit patterns may be disposed so as to be biased toward the bridge electrode 30.

The first pattern 10 and the second pattern 20 cross each other through an insulator by the bridge electrodes 30 which electrically connect the second patterns 20 in the second direction. Since the resistance of the sensing patterns is increased at the intersection, if the sensing patterns are formed as above, an effect of decreasing the resistance may be maximized.

The second auxiliary pattern 50 may be formed by separating from the bridge electrode 30, and may be formed on the same line to be connected with each other A method of forming the bridge electrode 30, the first and second auxiliary patterns 40 and 50, and the insulator 60 is not particularly limited, and for example, may be formed by the method within the range exemplified as the above-described method of fabricating the sensing pattern.

Further, a method of fabricating a touch sensing electrode according to another embodiment of the present invention will be described.

First, the bridge electrode 30 is formed.

The bridge electrode 30 functions to electrically connect the separated unit patterns of the second pattern 20 to be described below. The unit patterns of the second pattern 20 to be described below are electrically connected with each other by partially overlapping on both sides of the unit bridge electrode. Therefore, the above-described interval is equal to a difference between the width of the unit patterns of the second patterns 20 and the overlapped length with the unit bridge electrode on both sides thereof.

The bridge electrode 30 may be formed within the above-described range of the line width, the thickness, and the material.

Then, the first auxiliary pattern 40 is formed in the first direction, and the second auxiliary pattern 50 is formed in the second direction which is the same direction as the bridge electrode 30.

The first pattern 10 and the second pattern 20 are disposed in different directions from each other. For example, the first pattern 10 may be disposed in the X direction which is the first direction, and the second pattern 20 may be disposed in the Y direction which is the second direction orthogonal to the first direction, but it is not limited thereto.

The first pattern 10 to be described below is formed on the first auxiliary pattern 40, and the second pattern 20 is formed on the second auxiliary pattern 50. Herein, since the first patterns 10 are connected in the first direction to transmit the sensing signal, and the second patterns 20 are connected in the second direction by the bridge electrodes 30 to transmit the sensing signal, when the first and second auxiliary patterns 40 and 50 are formed in the respective directions, effects of decreasing the resistance and improving the touch sensitivity may be maximized.

The first and second auxiliary patterns 40 and 50 may be formed within the above-described range of the line width, the thickness, the length, and the material, and may be formed of the same material as the bridge electrode 30. In this case, it is possible to form the bridge electrode 30 and the first auxiliary pattern 40 in one process by using the same equipment without using separate equipment and processes for forming the same, respectively, such that the process efficiency may be significantly improved.

In addition, the first auxiliary pattern 40 may be separated into two or more unit patterns between the adjacent two bridge electrode 30, and two of the separated unit patterns may be disposed so as to be biased toward the bridge electrode 30. FIG. 7 is a plan view of the touch sensing electrode fabricated according to another embodiment of the present invention.

Similarly, the second auxiliary pattern 50 may be separated into two or more unit patterns between the adjacent two bridge electrode 30, and two of the separated unit patterns may be disposed so as to be biased toward the bridge electrode 30.

The first pattern 10 and the second pattern 20 cross each other through an insulator by the bridge electrodes 30 which electrically connect the second patterns 20 in the second direction. Since the resistance of the sensing patterns is increased at the intersection, if the sensing patterns are formed as above-described structure, an effect of decreasing the resistance may be maximized.

Then, the insulator 60 is formed on the bridge electrode 30.

The insulator 60 functions to electrically isolate the first pattern 10 from the bridge electrode 30 to be described below.

Next, the first pattern is formed so as to cover the first auxiliary pattern in the first direction, and the second pattern is formed so as to cover the second auxiliary pattern in the second direction.

Since the first pattern 10 should be insulated from the bridge electrode 30, it is formed in a manner in which the connection part of the unit patterns passes through the top of the insulator 60.

A method of forming the bridge electrode 30, the first and second auxiliary patterns 40 and 50, and the insulator 60 is not particularly limited, and for example, may be formed by the method within the range exemplified as the above-described method of fabricating the sensing pattern.

<Touch Screen Panel and Image Display Device)

In addition, the present invention provides a touch screen panel and an image display device including the pixel part.

The touch screen panel of the present invention may further include an alternative construction conventionally used in the related art, other than the touch sensing electrode and the pixel part.

In addition, the present invention provides an image display device including the touch screen panel.

Hereinafter, preferred embodiments will be described to more concretely understand the present invention with reference to examples and comparative examples. However, those skilled in the art will appreciate that such embodiments are provided for illustrative purposes and do not limit subject matters to be protected as disclosed in the detailed description and appended claims. Therefore, it will be apparent to those skilled in the art various alterations and modifications of the embodiments are possible within the scope and spirit of the present invention and duly included within the range as defined by the appended claims.

EXAMPLES

Preparative Groups 1 to 7

First patterns and second patterns were formed on a glass substrate (refractive index: 1.51, extinction coefficient: 0) by using ITO (refractive index: 1.8, extinction coefficient: 0).

Insulators were formed on the connection parts of the unit patterns of the first patterns by using an acrylic insulating material (refractive index: 1.51, extinction coefficient: 0), and bridge electrodes were formed on the insulators and had a line width of 8 μm, and a thickness of 0.2 μm by using molybdenum.

Then, auxiliary patterns having a line width, a thickness, and a length as stated in Table 1 below were formed on the first and second patterns.

The bridge electrodes and the auxiliary patterns were simultaneously formed in the same process.

The auxiliary patterns were made of molybdenum, and the touch sensing electrodes were prepared in such a manner that the first auxiliary pattern on the first pattern is formed so as to pass through a center of mass of the unit patterns of the first pattern, and the second auxiliary pattern on the second pattern is formed so that the elongation line thereof passes through the center of mass of the unit bridge electrodes.

For reference, the refractive index and the extinction coefficient were determined with reference to a light having a wavelength of 550 nm.

Touch screen panels were fabricated by bonding the prepared touch sensing electrodes on the pixel parts having a unit pixel length as stated in Table 1 below.

TABLE 1

| Section | Line width P1 of auxiliary pattern (μm) | Thickness P2 of auxiliary pattern (μm) | Length P3 of auxiliary pattern (μm) | Length A of unit pixel (μm) |
|---|---|---|---|---|
| Preparative Group 1 | 1.5 | 0.09 | 20, 40, 60, 80, 100, 120, 140, 160, 180, 200, 220 | 80 |
| Preparative Group 2 | 2.5 | 0.15 | 20, 40, 60, 80, 100, 120, 140, 160, 180, 200, 220 | 80 |
| Preparative Group 3 | 3.5 | 0.21 | 20, 40, 60, 80, 100, 120, 140, 160, 180, 200, 220 | 80 |
| Preparative Group 4 | 2.5 | 0.15 | 20, 40, 60, 80, 100, 120, 140, 160, 180, 200, 220 | 80 |
| Preparative Group 5 | 2.5 | 0.15 | 15, 30, 45, 60, 75, 90, 105, 120, 135, 150, 165 | 60 |
| Preparative Group 6 | 3.5 | 0.21 | 25, 50, 75, 100, 125, 150, 175, 200, 225, 250 275 | 100 |
| Preparative Group 7 | 4.5 | 0.27 | 30, 60, 90, 120, 150, 180, 210, 240, 270, 300 330 | 120 |

Figure 12:
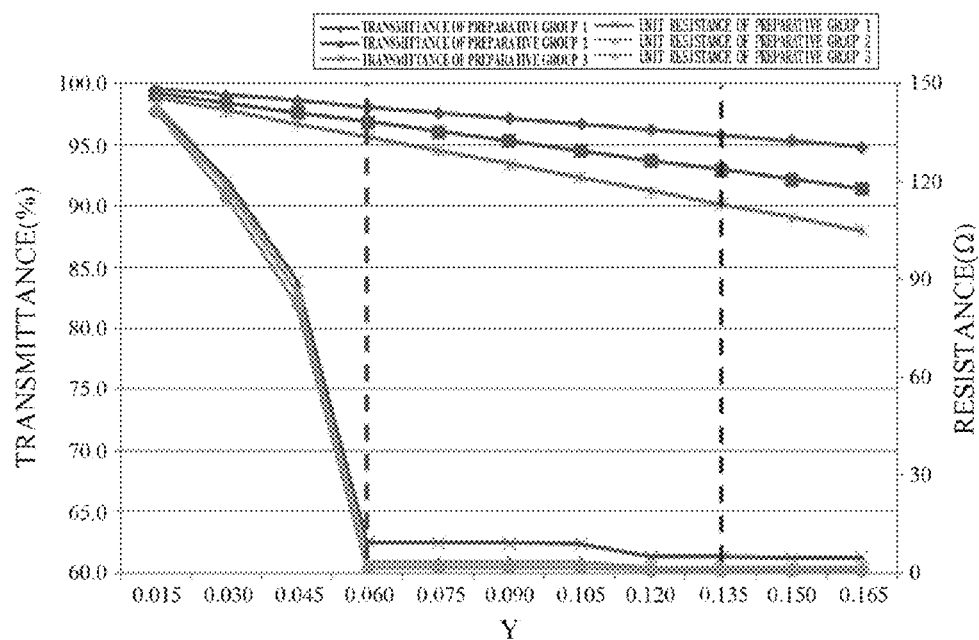
FIGS. 12 and 13 are graphs illustrating resistance and transmittance depending on Y value in each of Preparative Groups.
Figure 13:
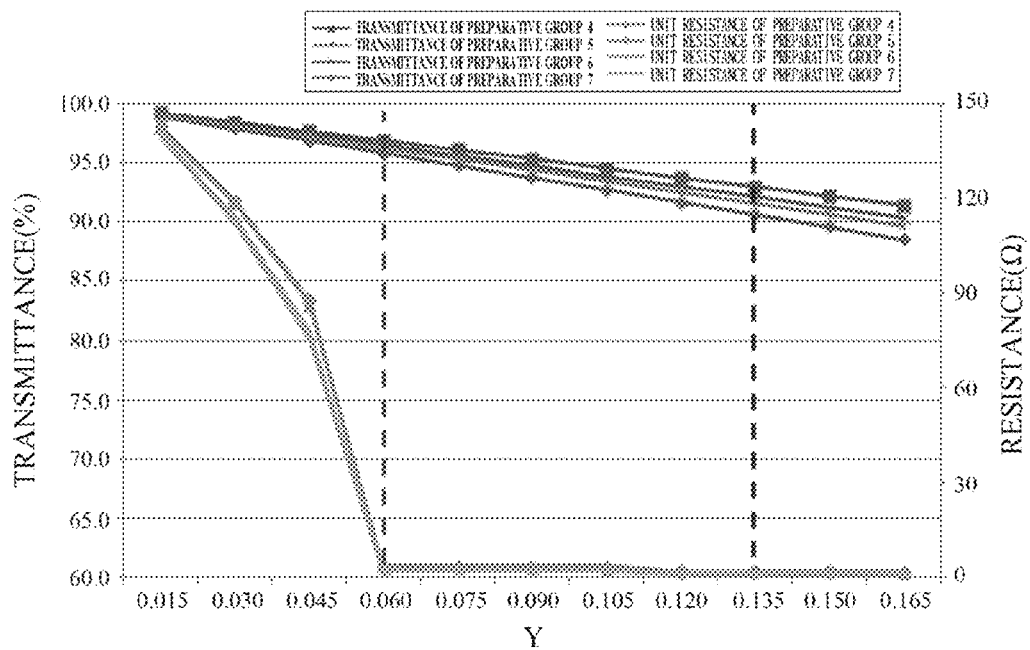

Experimental Example (1) Measurement of Unit Resistance and Transmittance Depending on Y Value Graphs obtained by calculating Y values of Preparative Groups by substituting P1, P1, P1 and A values in Equation 1, and measuring the unit resistance and transmittance depending on Y values are illustrated in FIGS. 12 and 13.

1) Measurement of Unit Resistance

Line resistance between one end and the other end of the sensing electrode positioned in the unit pixel of the Preparative Groups was calculated by using an electrical simulator (Q3D, Ansys Co.).

Unit resistance depending on the Y values is illustrated in FIGS. 12 and 13.

2) Measurement of Transmittance

Total transmittance of the touch sensing electrode of the Preparative Groups were measured by using a haze meter (HM-150, Murakami Co.), and transmittance was calculated compared to the glass substrate.

Transmittance depending on the Y values is illustrated in FIGS. 12 and 13.

Referring to FIGS. 12 and 13, it can be seen that the Y value is rapidly decreased from 0.06 or less in the fabricated touch screen panel of Preparative Groups, and when the Y value is 0.06 or more, the unit resistance is significantly decreased, such that it may be expected that the touch sensitivity is significantly improved, and when the Y value is within a range of 0.06 to 0.135, excellent transmittance (90% or more) is obtained. If the transmittance is 90% or more, the display brightness is excellent, and it is preferable in this aspect.

Specifically, referring to FIG. 12, it can be seen that, when the Y value is within a range of 0.06 to 0.135, the unit resistance is decreased in a sequence of Preparative Groups 1, 2, and 3, such that Preparative Group 3 has the smallest unit resistance, while the transmittance is decreased in the sequence of Preparative Groups 1, 2, and 3, such that Preparative Group 1 has the greatest transmittance.

Specifically, referring to FIG. 13, when the Y value is within a range of 0.06 to 0.135, the unit resistance is decreased in a sequence of Preparative Groups 4, 5, 6, and 7, such that Preparative Group 7 has the smallest unit resistance, while the transmittance is decreased in the sequence of Preparative Groups 4, 5, 6, and 7, such that Preparative Group 4 has the greatest transmittance.

However, it can be seen that in the Preparative Groups outside the range of the present invention, the unit resistance is large and the transmittance is not excellent.

DESCRIPTION OF REFERENCE NUMERALS

1: substrate, 10: first pattern
20: second pattern, 30: bridge electrode
40: first auxiliary pattern, 50: second auxiliary pattern
60: insulator, 70: additional auxiliary pattern

What is claimed is:

1. A touch screen panel comprising:
a touch sensing electrode; and
a pixel part disposed on a bottom of the touch sensing electrodes,
wherein the touch sensing electrode comprises: sensing patterns which include first patterns formed in a first direction and second patterns formed in a second direction;
bridge electrodes which electrically connect separated unit patterns of the second patterns; and
at least one auxiliary pattern which is provided on a top or a bottom of at least one of the first patterns and second patterns,
the pixel part includes a plurality of unit pixels, and
the auxiliary patterns respectively satisfy Equation 1 below:

$$0.06 \leq (P2/P1)*(P3/A) \leq 0.135 \quad \text{[Equation 1]}$$

(wherein, P1 denotes a line width of the auxiliary pattern in a range of 0.01 to 40 μm, P2 denotes a thickness of the auxiliary pattern in a range of 0.005 to 20 μm, P3 denotes a length of the auxiliary pattern in an upper area of the unit pixel in a range of 5 to 500 μm, and A denotes a length of the unit pixel).

2. The touch screen panel according to claim 1, wherein the P1 is 1 to 30 μm.

3. The touch screen panel according to claim 1, wherein the P2 is 0.05 to 1.5 μm.

4. The touch screen panel according to claim 1, wherein the P3 is 5 to 400 μm.

5. The touch screen panel according to claim 1, wherein the A is 20 to 500 μm.

6. The touch screen panel according to claim 1, wherein the P1 is 1 to 10 μm, P2 is 0.1 to 1.5 μm, P3 is 10 to 300 μm, and A is 20 to 400 μm.

7. The touch screen panel according to claim 1, wherein the P3 has the same value as A or a larger value than A.

8. The touch screen panel according to claim 1, wherein the first and second auxiliary patterns are formed of the same material as the bridge electrode.

9. The touch screen panel according to claim 1, wherein the unit patterns of the first patterns and the second patterns have a sheet resistance of 50 to 500Ω/□.

10. The touch screen panel according to claim 1, wherein the bridge electrode has a line width of 1 to 30 μm.

11. The touch screen panel according to claim 1, wherein the bridge electrode has a thickness of 0.05 to 1.5 μm.

12. The touch screen panel according to claim 1, wherein the bridge electrode is made of at least one selected from molybdenum, silver, aluminum, copper, palladium, gold, platinum, zinc, tin, and titanium, or an alloy thereof.

13. An image display device comprising the touch screen panel according to claim 1.

14. The touch screen panel according to claim 1, wherein the first pattern is provided with a first auxiliary pattern formed in the first direction, and the second pattern is provided with a second auxiliary pattern formed in the second direction.

15. The touch screen panel according to claim 14, wherein the second auxiliary patterns are connected to the bridge electrodes.

16. The touch screen panel according to claim 14, wherein the second auxiliary patterns are separated from the bridge electrodes.

17. The touch screen panel according to claim 14, wherein the first and second auxiliary patterns include one or, more separated additional auxiliary patterns, respectively.

18. The touch screen panel according to claim 14, wherein the first auxiliary pattern is separated into two or more unit patterns on a top or a bottom of the unit pattern of the first pattern, and two of the separated unit patterns are disposed so as to be biased toward the bridge electrode.

19. The touch screen panel according to claim 14, wherein the second auxiliary pattern is separated into two or more unit patterns on a top or a bottom of the unit pattern of the second pattern, and two of the separated unit patterns are disposed so as to be biased toward the bridge electrode.

* * * * *